United States Patent [19]

Tomite

[11] Patent Number: 5,091,667
[45] Date of Patent: Feb. 25, 1992

[54] D.C. MACHINE OF TYPE HAVING PERMANENT MAGNETS WITH AUXILIARY POLES

[75] Inventor: Toshio Tomite, Katsuta, Japan

[73] Assignees: Hatachi, Ltd., Tokyo; Hitachi Automotive Engineering Co., Ltd., Ibaraki, both of Japan

[21] Appl. No.: 544,943

[22] Filed: Jun. 28, 1990

[30] Foreign Application Priority Data

Jul. 1, 1989 [JP] Japan .................................. 1-170375
Sep. 16, 1989 [JP] Japan .................................. 1-240311

[51] Int. Cl.$^5$ ............................................. H02K 23/04
[52] U.S. Cl. ..................... 310/154; 310/198; 310/258; 310/261
[58] Field of Search ............... 310/154, 195, 234, 198, 310/261, 264, 254, 258, 233, 208, 89, 177, 42, 248; 335/296, 302

[56] References Cited

U.S. PATENT DOCUMENTS

| | | | |
|---|---|---|---|
| 4,469,969 | 9/1984 | Tomite | 310/154 |
| 4,823,037 | 4/1989 | Abukawa | 310/154 |
| 4,876,473 | 10/1989 | Tanaka | 310/261 |
| 4,918,830 | 9/1990 | Aso | 310/154 |

FOREIGN PATENT DOCUMENTS

| | | | |
|---|---|---|---|
| 0035721 | 10/1973 | Japan . | |
| 0153558 | 9/1982 | Japan . | |
| 0153573 | 10/1983 | Japan . | |
| 0034485 | 3/1984 | Japan . | |
| 0089560 | 5/1984 | Japan . | |
| 0219951 | 11/1985 | Japan . | |
| 0073563 | 4/1986 | Japan . | |
| 2110478 | 6/1983 | United Kingdom | 310/154 |

Primary Examiner—R. Skudy
Attorney, Agent, or Firm—Antonelli, Terry, Stout & Kraus

[57] ABSTRACT

A direct current machine is characterized in that each of field poles and an armature are formed to satisfy a condition that an internal peripheral width Wa of each auxiliary pole is equal to or greater than a distal end width Wt of each tooth and equal to or less than twice a distal end width Ws of each slot plus the distal end width of each tooth ($Wt \leq Wa \leq 2Ws + Wt$). The D.C. machine also is characterized in that each of the field poles and the armature are formed to satisfy a condition that an inner peripheral width Wm of the permanent magnet is equal to or greater than twice a slot pitch Wp of the armature core and equal to or less than twice the slot pitch Wp plus the distal end width Wt of each tooth ($2Wp \leq Wm \leq 2Wp + Wt$).

10 Claims, 4 Drawing Sheets

D.C. MACHINE OF TYPE HAVING PERMANENT MAGNETS WITH AUXILIARY POLES

BACKGROUND OF THE INVENTION

The present invention relates to D.C. machines having a plurality of field poles each of which comprises a permanent magnet and an auxiliary pole juxtaposed to the permanent magnet and made of a magnetic material exhibiting a reversible permeability higher than that of the permanent magnet.

D.C. motors having field poles made of permanent magnets and auxiliary poles are known as disclosed in Japanese patent Laid-Open No. 57-153558/1982. The D.C. motor disclosed therein has a plurality of field poles each consisting of a permanent magnet and an auxiliary pole which are juxtaposed circumferentially on the inner peripheral portion of a yoke. The auxiliary pole is made of a magnetic material exhibiting a reversible permeability higher than that of the permanent magnet, and is arranged at the side of the permanent magnet wherein the magnetic field flux is increased by an armature reaction.

The D.C. machine provided with such auxiliary poles has the advantage that, owing to the arrangement of each auxiliary pole on the side of the magnet in which the magnetic field flux is increased by the armature reaction, an increased magnetic flux effectively passes through an armature core, thereby to heighten a torque.

There have been proposed various techniques for further enhancing the performances of the D.C. machines, for example, through improvements in dimensional relationship between the permanent magnet, the auxiliary pole and teeth and slots of an armature. Examples of those techniques are as follows:

A D.C. machine disclosed in Japanese Utility Model Laid-Open No. 58-153573 (1983) is provided with permanent magnets and auxiliary poles in which the width of each of the permanent magnets has a width twice as wide as one of an auxiliary pole, whereby performance of the D.C. machine is enhanced.

Japanese Utility Model Laid-Open No. 59-34485 (1984) discloses a D.C. machine in which the length of air gap defined between a permanent magnet and an auxiliary pole is made shorter than the width of a slot opening.

Further, there is Japanese patent Laid-Open No. 61-73563 which is concerned with a fixing structure in a D.C. motor in which a permanent magnet and an auxiliary pole are fixed to a yoke by a sleeve having concave and convex portions. Although this Japanese Patent Laid-Open does not have therein any description on a dimensional relationship between tooth width or tooth pitch of an armature and the width of the permanent magnet or the auxiliary pole, it seems from an illustration of the fixing structure of the permanent magnet and the auxiliary pole to the yoke that the dimensional relationship between the permanent magnet, the auxiliary pole and tooth pitch or width is taken into consideration.

Further, in a D.C. machine for conducting a high current and attaining a high torque, such as a starting motor for automobiles, a large number of thick coils need to be wound on an armature, which naturally increases the number of slots. For example, the number of the coils per slot is 2-6 or so, and the number of the slots per pole is at least 4 (in general, 5 to 9). Thus, the torque is heightened by increase in the total number of the coils and the resultant increase in the amounts of magnetic fluxes.

As mentioned above, various techniques have been used for attaining high performance of D.C. machines. However, it is still required to attain further high performance of the D.C. machines without increasing size of the machine.

SUMMARY OF THE INVENTION

As stated above, the performance of D.C. machines have hitherto been bettered through improvements of relationships of the auxiliary poles to the permanent magnets or the increases in the numbers of the slots and coils. However, even when the improvements are made, the relations of the inner peripheral width of the auxiliary pole to the slot pitches of the armature core, the distal end width of the slot and the distal end width of each of teeth, etc. are not sufficiently considered, and points to be bettered are left as stated below.

By way of example, when the distal end width of each of the teeth of the armature broadens excessively relative to the inner peripheral width of the auxiliary pole, the magnetic flux density of the teeth becomes low, and the teeth cannot be effectively used, so that the performance degrades. On the other hand, when the inner peripheral width of the auxiliary pole broadens excessively as compared with the distal end width of each of the teeth, the magnetic flux density of the tooth side heightens relative to that of the auxiliary pole, and the degree at which the magnetic flux leaks to the adjacent tooth increases. In a case where the adjacent tooth lies near a magnetic neutral point, the leakage flux gives rise to magnetic induction in a brush arranged at the magnetic neutral point and strikes a spark across the brush and a commutator, thereby to form a cause for worsening commutation and incurring degradation in the performance.

The present invention has been made in view of the above points.

An object of the present invention is to provide a D.C. machine of the type having permanent magnets and auxiliary poles, in which the performance thereof is enhanced without enlarging the size of the machine.

Another object of the present invention is to provide a D.C. machine of the type having permanent magnets and auxiliary poles, in which the relations of the pitches of slots, the distal end width of each slot, the distal end width of each tooth, etc. on an armature side to each of the auxiliary poles are improved, whereby the performance of the machine can be bettered without enlarging the size thereof.

The present invention resides in a direct current machine comprising a cylindrical yoke, a plurality of field poles each mounted on an inner side of the yoke and including a permanent magnet and auxiliary pole juxtaposed on an inner surface of the yoke in a circumferential direction, the auxiliary pole being located at a side of the permanent magnet in which magnetic flux is increased by armature reaction, and an armature having an armature core arranged in the yoke so as to face, at its outer peripheral surface, the inner peripheral surfaces of the permanent magnets and the auxiliary poles with a predetermined gap therebetween, characterized in that each of the field poles and the armature are formed to satisfy a condition that an internal peripheral width Wa of each auxiliary pole is equal to or greater than a distal end width Wt of each tooth and equal to or less than twice a distal end width Ws of each slot plus the distal end width of each tooth ($Wt \leq Wa \leq 2Ws+Wt$).

In case a circumferential gap Gp is defined between each of the permanent magnets and each of the auxiliary poles, the condition is that the internal peripheral width Wa of each auxiliary pole plus the circumferential gap Gp is equal to or larger than the distal end width Wt of each tooth and equal to or less than twice the distal end width Ws of each slot plus the distal end width Wt of each tooth ($Wt \leq Wa+Gp \leq 2Ws+Wt$), and the circumferential gap Gp is equal to or less than twice the distal end width Ws of each slot ($Gp \leq 2Ws$).

As for the dimensional relation of the inner peripheral width Wa of the auxiliary pole to the distal end width Wt and the width Ws of each slot in the armature ($Wt \leq Wa \leq 2Ws+Wt$), first of all, the relation of the distal end width Wt of the tooth and the amount of an effective magnetic flux to the inner peripheral width Wa of the auxiliary pole will be first elucidated.

In a case where the auxiliary pole has its magnetic flux passed through the tooth opposing thereto, the amount of the magnetic flux from the auxiliary pole is the largest when Wa/Wt is 1 (one), and it is not enlarged even by a further increase in Wt unless the magnetic flux from the auxiliary pole changes. Rather, since the width of the tooth is broad relative to that of the auxiliary pole under the condition of $Wt > Wa$, the magnetic flux density of the tooth lowers excessively, and the tooth cannot be effectively used.

Moreover, since the tooth is actually a rotary member, it becomes more effective for the enhancement of a performance than setting Wa/Wt at 1 that the state in which the amount of the magnetic flux passing through the tooth opposite the auxiliary pole is the 100% amount permitted to be passed by the tooth itself is held for a certain period of time. It is therefore more preferable to set $Wt \leq Wa$. However, the relation of $Wt \leq Wa$ is subject to another limitation. As already stated, when the inner peripheral width Wa of the auxiliary pole becomes greater than the distal end width Wt of the tooth more than is necessary, the magnetic flux density of the opposing tooth side heightens relative to that of the auxiliary pole, so that the degree at which part of the magnetic flux of the auxiliary pole side (increased field side) leaks to the adjacent tooth (the tooth nearest a magnetic neutral point) increases, and the leakage flux from the increased field side forms a cause for worsening commutation. In particular, such a commutation worsening phenomenon is liable to occur when, as in a high current region, the armature reaction is intense to incur a magnetic unbalance in which the magnetic flux amount of the auxiliary pole side (increased field side) becomes excessive in comparison with that of the permanent magnet side. In terms of the relationship among the inner peripheral width Wa of the auxiliary pole, the width Wt of the tooth and the width Ws of the slot, the criterion of the limitation can be expressed as $Wt \leq Wa \leq 2Ws+Wt$. That is, when this condition is satisfied, the inner peripheral width Wa of the auxiliary pole does not become very great relative to the tooth width, and the magnetic flux from the auxiliary pole can be passed through the tooth opposite this pole by utilizing the distal end width of the tooth effectively to the utmost.

In addition, the magnetic flux to leak to the adjacent tooth is reduced as far as possible, and the commutation between a brush and a commutator can be prevented from worsening.

In case the gap Gp exists between the permanent magnet and the auxiliary pole, the same operations as above can be effected by establishing the magnetic pole structure which satisfies the condition of $Wt \leq Wa+Gp \leq 2Ws+Wt$. More specifically, in this case, the auxiliary pole becomes closer to the magnetic neutral point in correspondence with the existence of the gap Gp. The relationship of the dimensions is therefore set with the component of the gap Gp taken into account beforehand, thereby to consider that the magnetic flux to leak to the adjacent tooth side is reduced to the utmost.

According to an aspect of the present invention, a D.C. motor comprising a cylindrical yoke, a plurality of field poles each mounted on an inner side of the yoke and including a permanent magnet and auxiliary pole juxtaposed on an inner surface of the yoke in a circumferential direction, the auxiliary pole being located at a side of the permanent magnet in which magnetic flux is increased by armature reaction, and an armature having an armature core arranged in the yoke so as to face, at its outer peripheral surface, the inner peripheral surfaces of the permanent magnets and the auxiliary poles with a predetermined gap therebetween is characterized in that each of the field poles and the armature are formed to satisfy a condition that an internal peripheral width Wa of each auxiliary pole is equal to or greater than a distal end width Wt of each tooth and equal to or less than twice a distal end width Ws of each slot plus the distal end width Wt of each width and a condition that an inner peripheral width Wm of the permanent magnet is equal to or greater than twice a slot pitch Wp of the armature core and equal to or less than twice the slot pitch Wp plus the distal end width Wt of each tooth ($2Wp \leq Wm \leq 2Wp+Wt$).

According to this feature, in addition of the dimensional relation of the width of the auxiliary pole to the widths of tooth and slot, the inner peripheral width Wm of the permanent magnet serving as a main pole is set at $2Wp \leq Wm \leq 2Wp+Wt$ in relation to the pitch Wp of the slot and the distal end width Wt of the tooth in the armature core. With such setting, the magnetic flux from the permanent magnet can be sufficiently passed through the opposing tooth, and the permanent magnet can be balanced with the auxiliary pole, so that the function of the auxiliary pole can be effectively utilized. At $Wm \leq 2Wp$, the magnetic flux of the permanent magnet itself is insufficient, while at $3Wp \leq Wm$, the inner peripheral width of the auxiliary pole cannot be held sufficient, so that the function of the auxiliary pole stated before cannot be fully utilized.

A D.C. machine for enhancing the performance thereof, for example attaining a high torque without enlarging the size, according to an aspect of the present invention comprises a cylindrical yoke, a plurality of field poles each mounted on an inner side of the yoke and including a permanent magnet and auxiliary pole juxtaposed on an inner surface of the yoke in a circumferential direction, the auxiliary pole being located at a side of the permanent magnet in which magnetic flux is increased by armature reaction, and an armature having an armature core arranged in the yoke so as to face, at its outer peripheral surface, the inner peripheral surfaces of the permanent magnets and the auxiliary poles with a predetermined gap therebetween, and is characterized in that an inner peripheral width Wm of the permanent magnet is equal to or greater than twice a slot pitch Wp of the armature core and equal to or less than twice the slot pitch Wp plus a distal end with Wt of each tooth (2Wp≦Wm≦2Wp+Wt).

DETAILED DESCRIPTION OF THE INVENTION

An embodiment will be described hereunder in detail.

In a D.C. machine of the type having permanent magnets with auxiliary poles, a structure thereof for increasing an amount of an effective magnetic flux to pass through teeth of an armature thereby to enhance the performance of the machine such as torque is such that each of permanent magnets, which has its inner peripheral width set to be equal to or greater than 2 slot pitches of an armature core and equal to or less than (2 slot pitches +a distal end width of each of teeth of the armature core), is mounted extending over both sides of an increased field and a decreased field of an armature reaction.

If there are gaps Gp between the permanent magnet and the auxiliary pole, the structure for enhancing the performance of the D.C. machine is such that each of permanent magnets, an inner peripheral width of which as added to a gap defined between each permanent magnet and a corresponding auxiliary pole is set to be equal to or greater than 2 slot pitches of an armature core and equal to or less than (2 slot pitches +a distal end width of each of teeth of the armature core), is mounted extending over both sides of an increased field and a decreased field of an armature reaction.

Owing to the above structures, a developed magnetic flux passes through the armature core effectively, whereby the torque of a D.C. machine is heightened.

More specifically, it is known that a D.C. machine of the type having a permanent magnet field system with auxiliary poles uses magnetic fluxes from the auxiliary poles and magnetic fluxes from the permanent magnets efficiently and effectively, thereby to afford a high torque D.C. machine. In a D.C. machine for conducting a high current and attaining a high torque, such as a starting motor for automobiles, however, thick wire needs to be wound on the armature. Naturally the number of slots enlarges, and it is common that the number of coils per slot is 2-6 or so, while the number of slots per pole is 5 to 9. The torque has been heightened by increase in the total number of the coils and increase in the amounts of the magnetic fluxes.

In this manner, the relationship between the inner peripheral width of each permanent magnet and the pitches of the slots as well as the distal end width of each tooth has not been revealed. In the present invention, therefore, the optimum dimensional relationship for effectively passing the developed magnetic field through the armature core and attaining a higher torque is revealed, and a higher performance is further attained.

The embodiment will be described referring to FIGS. 1 to 4.

Figure 1:
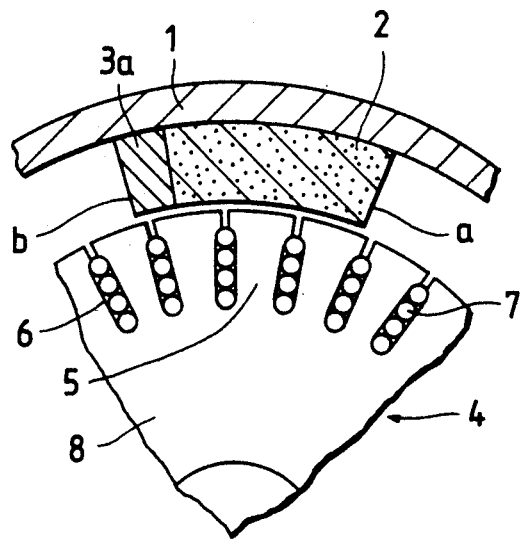
FIG. 1 is a sectional view of a part of an embodiment of a D.C. motor of the type having permanent magnets and auxiliary poles according to the present invention.
Figure 2:
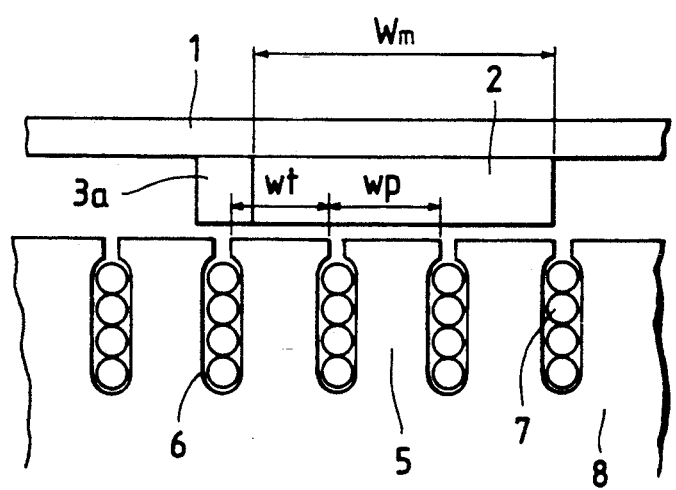
FIG. 2 is a development of FIG. 1.

In FIGS. 1 and 2, a D.C. machine of the type having permanent magnets with auxiliary poles comprises a permanent magnet field portion which is arranged in opposition to armature cores 8 each having slots 6 and teeth 5, through a predetermined gap. The permanent magnet field portion is such that the permanent magnets 2, and auxiliary poles 3a made of a magnetic material exhibiting a reversible permeability higher than that of the permanent magnets 2 are juxtaposed in the circumferential direction of the inner peripheral surface of a yoke 1 without defining any gap, and the number of the slots 6 for receiving coils 7 is, at least, 4 slots/pole. More specifically, the permanent magnets 2 and auxiliary poles 3a are juxtaposed circumferentially on the inner surface of the cylindrical yoke 1, and an armature 4 which has the coils 7 wound in the slots 6 is rotatably mounted in opposition to the permanent magnets 2 as well as the auxiliary poles 3a. Incidentally, the permanent magnet 2 is formed of a ferrite magnet, a rare-earth magnet, or the like, while the auxiliary pole 3a is formed of a member which is made of the material, for example, soft iron, higher in the reversible permeability than the permanent magnet 2. In addition, the coils 7 are inserted in a manner to be enveloped in the semiclosed type slots 6 and the teeth 5 which are punchedly formed in the armature core 8. In the thus constructed D.C. machine of the type having the permanent magnets with the auxiliary poles, according to this embodiment, each of the permanent magnets 2, which has its inner peripheral width set to be greater than 2 slot pitches of the armature core 8 and less than (2 slot pitches +the distal end width of each of the teeth 5 of the armature core 8), is mounted extending over both the sides of the increased field and decreased field of an armature reaction. In this way, a developed magnetic flux is effectively passes through the armature core 8, and the torque of the D.C. machine is heightened, thereby making it possible to provide a D.C. machine of the type having permanent magnets with auxiliary poles in which the amounts of effective magnetic fluxes to pass through the teeth 5 of the armature 4 are increased to realize enhancement in performance.

That is, letting Wp denote one slot pitch, Wt denote the distal end width of each tooth 5, and Wm denote the width of each permanent magnet 2 (the inner peripheral width of the permanent magnet 2), 2×Wp≦Wm≦2×Wp+Wt is established, this measure achieves one of the intended objects, and will now be elucidated.

When currents flow through the coils 7 of the armature 4 from the rear side toward the front side of the sheet of the drawing, an armature reaction in the counterclockwise direction is generated by Fleming's left-hand rule, to exert the intensest decreased magnetic field on the end part a of the permanent magnet 2 and the intensest increased magnetic field on the end part b of the auxiliary pole 3a. If, at this time, a brush (not shown) lies at the position of a magnetic neutral point, the permanent magnet side with respect to the center of the field system has its field decreased, and the auxiliary pole side has its field increased. Consequently, the armature 4 is rotated by the amount of the magnetic flux of the permanent magnet 2 of the decreased field and that of the magnetic flux of the auxiliary pole 3a of the increased field. In this manner, the amount of the magnetic flux which passes through the teeth 5 on the side near the end part b of the auxiliary pole 3a enlarges relative to the amount of the magnetic flux which passes through the teeth 5 on the side near the end part a of the permanent magnet 2. By setting the inner peripheral width Wm of the permanent magnet 2 at $2 \times Wp \leq Wm \leq 2 \times Wp + Wt$ as stated before, accordingly, the magnetic flux can be effectively passed from the permanent magnet 2 owing to the utmost utilization of the teeth 5 on the side near the auxiliary pole 3a. When $Wm > 2Wp$ holds, the magnetic flux is difficult of passing through the teeth 5 on the auxiliary pole side. To the contrary, when $3Wp \leq Wm$ holds, the effect of the auxiliary pole 3a cannot be fully exploited.

Thus, according to this embodiment, the relationship of the permanent magnets with the teeth of the armature has been determined so as to satisfy the aforementioned conditions, as the width of each permanent magnet with which the amount of the magnetic flux of the permanent magnet is effectively utilized while the field increasing effect of the auxiliary pole is kept fully utilized. In an example, therefore, the torque of the D.C. machine could be heightened about 10%. Accordingly, the D.C. machine could be made smaller in size and lighter in weight, and the installation space thereof could be reduced.

Figure 3:
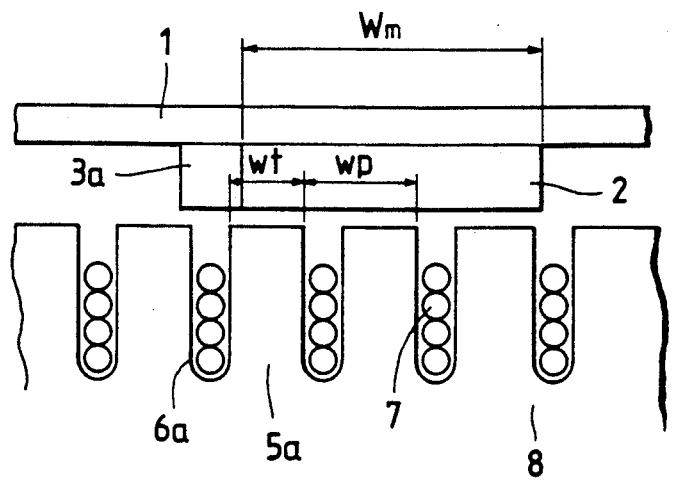
FIG. 3 is a development of a modification of FIG. 1.

FIG. 3 shows a modification of FIG. 2. In this modification, slots 6a are of the open type, and the other construction is the same as in FIGS. 1 and 2. Also in this case, as in the foregoing case, the inner peripheral width Wm of each permanent magnet 2 related to the slot pitch Wp and the distal end width Wt of each tooth is $2 \times Wp \leq Wm \leq 2 \times Wp + Wt$. In this way, a developed magnetic flux comes to effectively pass through the armature cores 8, and the same functional effects as in the foregoing case can be produced.

Figure 4:
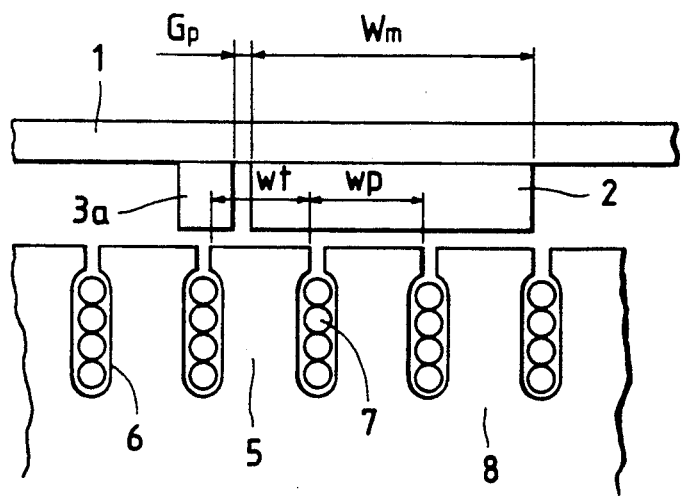
FIG. 4 is a development of another modification of FIG. 1.

FIG. 4 shows another modification of the embodiment shown in FIG. 2. In this modification, an air gap Gp is defined between an auxiliary pole 3a and a corresponding permanent magnet 2. In this case, the relationship of the inner peripheral width Wm of the permanent magnet 2 to one slot pitch Wp, the distal end width Wt of one tooth and the air gap Gp is set at $2 \times Wp \leq Gp + Wm \leq 2 \times Wp + Wt$. In this way, a developed magnetic flux comes to effectively pass through the armature cores 8, and the same functional effects as in the foregoing case can be produced. Incidentally, although this modification has semiclosed type slots 6, it can be similarly performed for open type slots and can achieve similar functional effects.

Another embodiment of the present invention will be described hereunder referring to FIGS. 5 to 9.

Figure 5:
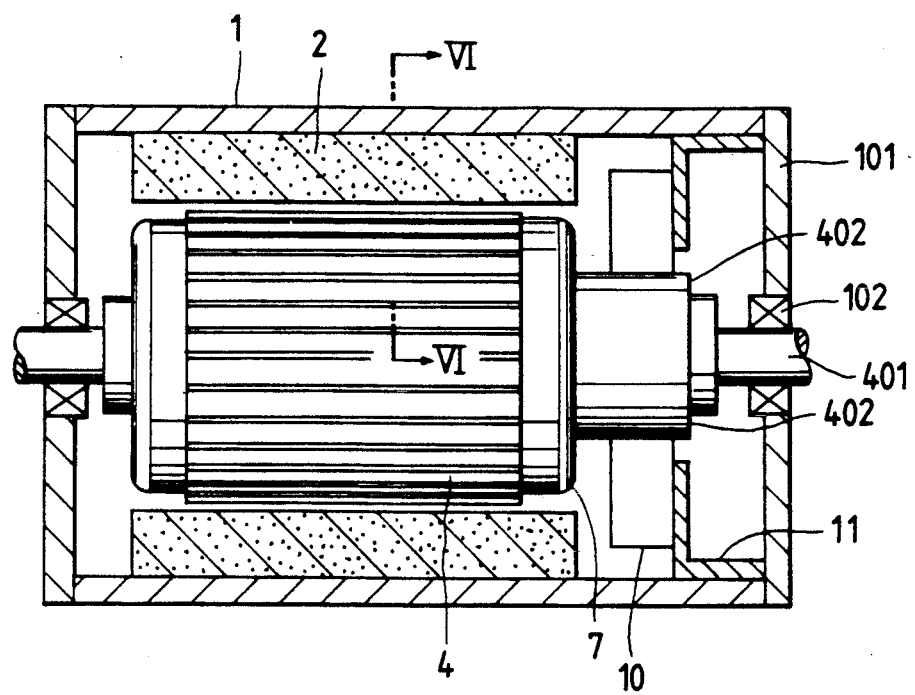
FIG. 5 is a sectional view of another embodiment of a D.C. motor of the type having permanent magnets and auxiliary poles according to the present invention.
Figure 6:
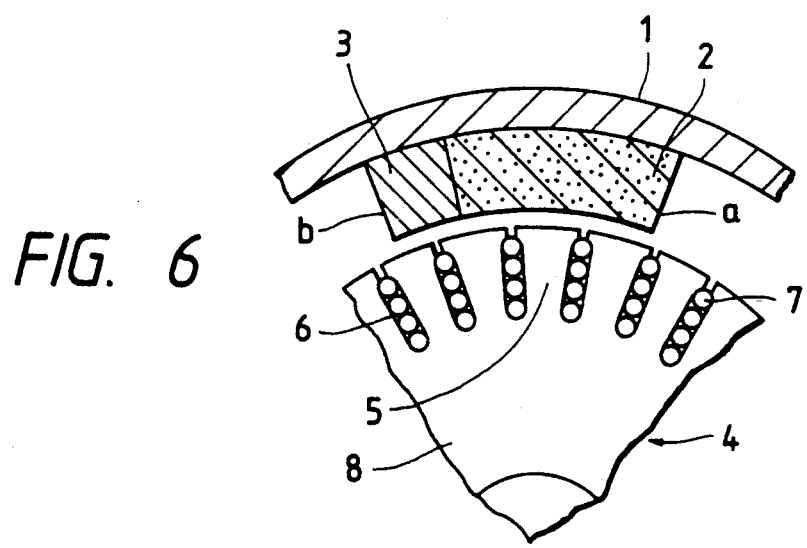
FIG. 6 is an enlarged sectional view of a part of FIG. 5 taken along a line VI—VI.

In FIGS. 5 and 6 showing a motor for starting an internal combustion engine as the embodiment of the D.C. machine of the type having permanent magnets and auxiliary poles, the motor comprises a cylindrical yoke 1, a pair of end plates 101 secured to ends of the yoke 1, an armature 4 rotatably supported by the end plates 101 through bearings 102 at its journal portions 401, a plurality of permanent magnets 2, for example, six (6) permanent magnets 2, secured to the yoke 1, and auxiliary poles 3.

The permanent magnet 2 and the auxiliary pole 3 constitute a field pole of the D.C. machine. They are juxtaposed on an inner peripheral surface of the yoke 1 and in the circumferential direction thereof. The auxiliary pole 3 adjoins the permanent magnet 2 without defining a gap, and it is arranged at a position where the magnetic field is increased by an armature reaction. The armature 4 has armature cores 8, in which a plurality of slots 6 (for example, 29 slots) are formed thereby to produce teeth 5 for passing a magnetic field from the field pole. Coils 7 are disposed in the slots 6 to be wound around the teeth 5. The armature is provided on one side thereof a commutator 402 contacting with brashes 10 held by brush holders 11.

In this embodiment, a ferrite magnet, a rare earth magnet or the like is used as the permanent magnet 2. The auxiliary pole 3 is made of a member of a material exhibiting a reversible permeability higher than that of the permanent magnet 2, for example, soft iron. Although, in FIG. 6, only one pole of the field pole is depicted, the other quadrants are similarly constructed.

In addition, the slots 6 on the side of the armature 4 are semiclosed type slots punched in the armature core 8, and the coils 7 are inserted in a manner to be surrounded with the teeth 5.

Figure 7:
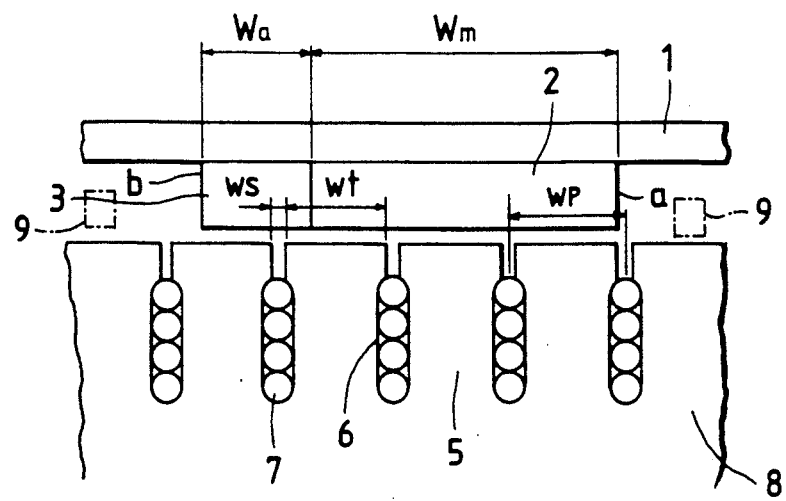
FIG. 7 is a development of FIG. 6.

Referring to FIG. 7 which is a development of FIG. 6, numeral 9 indicates the installation position of the brush 10, which is set approximately at a magnetic neutral point.

Here, symbol Ws denotes the distal end width of the slot, symbol Wt the distal end width of the tooth, and symbol Wa the inner peripheral width of the auxiliary pole 3. The relationship of them is set so as to satisfy the following condition:

$$Wt \leq Wa \leq 2 \times Ws + Wt$$

The practicable dimensions of the widths will be exemplified later.

Further, in this embodiment, it is preferable to incorporate the following relation as described in the previous embodiment, that is, in case of letting Wm denote the width of the permanent magnet 2 and Wp denote the pitch of the slot, these dimensions are set so as to satisfy the following condition:

$$2 \times Wp \leq Wm \leq 2 \times Wp + Wt$$

Next, the operation of the embodiment will be described.

Assuming that the permanent magnet 2 shown in FIG. 6 is of N-pole, when currents flow through the coils 7 of the armature 4 from the rear side toward the front side of the sheet of the drawing, the armature reaction is generated countercockwise by the left-hand rule of Fleming, to exert the intensest decreased field on the end part a of the permanent magnet 2 and the intensest increased field on the end part b of the auxiliary pole 3.

If, at this time, the coil currents are flowing through the brushes 10, the armature 4 is rotated by the amount of the magnetic flux of the permanent magnet 2 of the decreased field and that of the magnetic flux of the auxiliary pole 3 of an increased field.

It is readily understood from the above that the amount of a magnetic flux which passes through the tooth 5 on a side near the end part b of the auxiliary pole 3 becomes large relative to the amount of a magnetic flux which passes through the tooth on a side near the end part a of the permanent magnet 2. Particularly in a high current region, the amount of the magnetic flux from the auxiliary pole increases, and the difference of the flux density of the auxiliary pole from that of the permanent magnet side enlarges. As also stated previously, unless the relations of the inner peripheral width of the auxiliary pole and the tooth width etc. on the armature side are sufficiently considered under such a situation, the leakage flux adversely affects the vicinity of the brush, to worsen the commutation.

In this embodiment, the aforementioned dimensional relationship of $Wt \leq Wa \leq 2\,Ws + Wt$ is set in order to avoid the occurrence of such a drawback. That is, when the dimensional relationship is thus set, the sufficient amount of the magnetic flux from the auxiliary pole 3 can be passed through the opposing tooth 5 by utilizing the distal end width of the tooth as effectively as possible, and the commutation between the brush 10 and commutator 402 can be prevented from worsening by reducing the leakage flux to the adjacent tooth to the utmost. In this regard, under the condition of $Wa < Wt$, the tooth width is broad relative to the width of the auxiliary pole, so that the tooth has its flux density lowered and cannot be effectively utilized. To the contrary, under the condition of $Wa > 2 \times Ws + Wt$, the flux density of the tooth 5 heightens relative to that of the auxiliary pole 3, and the magnetic flux leaks to the adjacent tooth (tooth nearest to the brush), with the result that the commutation by the brush is adversely affected.

As thus far described, this embodiment produces the effects that the effective magnetic flux of the auxiliary pole can be held sufficient and that the commutation can be improved. Here, the effects will be explained by mentioning practicable dimensional examples.

As the first example, a D.C. machine whose yoke had an outside diameter of 90 mm will be referred to. In the prior art, an engine starting motor whose maximum power was 0.85 kW could be fabricated with $Wa = 10.44$ mm, $Wt = 5.46$ mm and $Ws = 2.7$ mm, whereas according to the present invention, the maximum power of 0.93 kW could be generated to attain a power enhancement of about 10% by setting $Wa = 8.12$ mm, $Wt = 5.82$ mm and $Ws = 1.5$ mm.

Likewise, in the example in which a yoke had an outside diameter of 80 mm, in the prior art, the maximum power was 0.82 kW with $Wa = 9.26$ mm, $Wt = 4.55$ mm and $Ws = 2.7$ mm, whereas according to the present invention, the maximum power became 0.93 kW with $Wa = 6.69$ mm, $Wt = 4.75$ mm and $Ws = 1.5$ mm, whereby a power enhancement of above 10% could be attained in this case.

By the way, regarding the relation of $Wt/Wa$, the prior art had a value near 0.5, whereas this embodiment set the ratio at or above 0.7 and increased an opposing area to the extent of 20%, whereby the passage of the magnetic flux between the auxiliary pole and the tooth was improved.

Further, in this embodiment it is preferable that the relationship among the width Wm of the permanent magnet 2, the pitch Wp of the slot and the distal end width Wt of the tooth is set at $2 \times Wp \leq Wm \leq 2 \times Wp + Wt$, and the setting also contributes to the achievement of the effects. That is, when the inner peripheral width Wm of the permanent magnet to serve as the main pole is set as mentioned above, the magnetic flux from the permanent magnet 2 can be sufficiently passed through the opposing teeth 5, and moreover, the permanent magnet can be balanced with the auxiliary pole 3, so that the function of the auxiliary pole can be effectively utilized.

Figure 8:
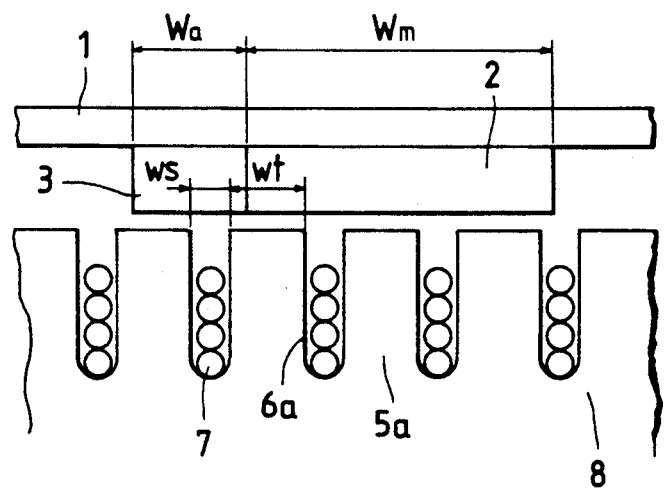
FIG. 8 is a development of a modification of FIG. 6.

FIG. 8 is a development of essential portions showing a modification of the first embodiment of the present invention. This modification is such that the slots of an armature core 8 are in the shape of open slots 6a. The open slots 6a define teeth 5a as illustrated in FIG. 8. Also in this case, similarly to the foregoing, the power enhancement of a motor can be attained by setting the same dimensional relationships as in the first embodiment.

Figure 9:
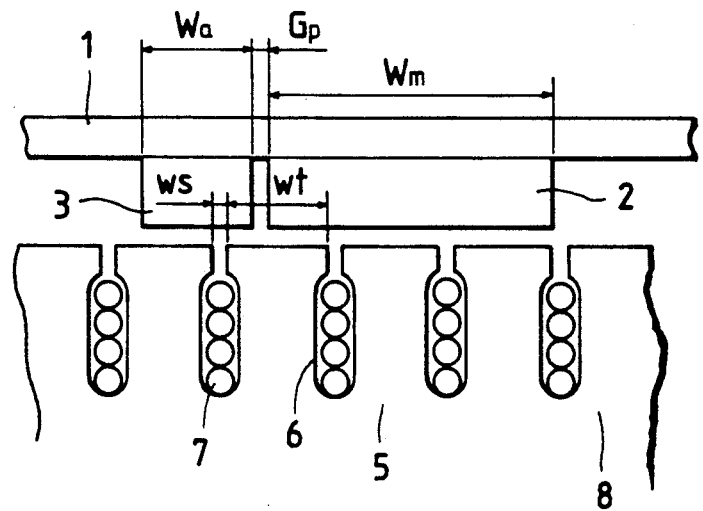
FIG. 9 is a development of another modification of FIG. 6.

FIG. 9 is another development of essential portions showing another modification of the first embodiment of the present invention. This modification employs the same semiclosed type slots 6 as the embodiment shown in FIGS. 6 and 7, and it differs from the embodiment in that a permanent magnet 2 and an auxiliary pole 3 are juxtaposed with a gap Gp defined therebetween.

In this case, in consideration of the existence of the gap Gp, the relationship among the inner peripheral width Wa of the auxiliary pole, the width Wt of a tooth and the width Ws of the slot is set at the condition of $Wt \leq Wa + Gp \leq 2 \times Ws + Wt$, and the relationship among the inner peripheral width Wm of the permanent magnet 2, the pitch Wp of the slot and the distal end width Wt of the tooth is set at $2\,Wp \leq Wm + Gp \leq 2\,Ws + Wt$, wherein $Gp \leq 2Ws$.

Under such set conditions, the same effects as in the embodiment shown in FIGS. 6 and 7 can be achieved.

In any embodiment it is preferable a width of each of the teeth at a position at which a winding coil is wound is substantially equal to or greater than a width of each of the slots at the position at which the winding coil is inserted.

As described above, according to the embodiment of the present invention, the inner peripheral width of each auxiliary pole, and the distal end widths of each tooth and each slot in an armature are set at a predetermined condition, or besides this condition, the inner peripheral width of each permanent magnet, the pitch of the slot, the distal end width of the tooth, etc. are set at a predetermined relationship, whereby the commutation of brushes can be performed favorably while the field increasing function of the auxiliary pole is satisfactorily utilized, and the power of a D.C. machine can be enhanced without enlarging the size of equipment.

What is claimed is:

1. A D.C. machine comprising
   a cylindrical yoke;
   a plurality of field poles each mounted on an inner side of said cylindrical yoke, and including a permanent magnet and an auxiliary pole juxtaposed on an inner surface of said cylindrical yoke in a circumferential direction, said auxiliary pole being made of magnetic material exhibiting a reversible permeability higher than that of said permanent magnet and located on a side of said permanent magnet in which magnetic flux is increased by armature reaction;
   an armature having an armature core arranged in said cylindrical yoke so as to face inner peripheral surfaces at its outer peripheral surface with a predetermined gap therebetween, characterized by a structure which satisfies a condition that an inner peripheral width Wa of said auxiliary pole with a circumferential gap Gp defined between said permanent magnet and said auxiliary pole is equal to or greater than a distal end width Wt of each of teeth of said armature core and equal to or less than double a distal end width Ws of a slot of said armature core, plus said distal end width Wt of each of said teeth (Wt≦Wa+Gp≦2 Ws+Wt).

2. A D.C. machine according to claim 1, wherein in case said auxiliary pole and said permanent magnet are juxtaposed to contact with each other so that the circumferential gap Gp is substantially zero, said condition is being (Wt≦Wa≦2 Ws+Wt).

3. A D.C. machine comprising
a cylindrical yoke;
a plurality of field poles each mounted on an inner side of said cylindrical yoke, and including a permanent magnet and an auxiliary pole juxtaposed on an inner surface of said cylindrical yoke in a circumferential direction, said auxiliary pole being made of magnetic material exhibiting a reversible permeability higher than that of said permanent magnet and located on a side of said permanent magnet in which magnetic flux is increased by armature reaction;
an armature having an armature core arranged in said cylindrical yoke so as to face inner peripheral surfaces at its outer peripheral surface with a predetermined gap therebetween, characterized by a structure which satisfies a condition that an inner peripheral width Wa of said auxiliary pole with a circumferential gap Gp defined between said permanent magnet and said auxiliary pole is greater than a distal end width Wt of each of teeth of said armature core and less than double a distal end width Ws of a slot of said armature core, plus said distal end width Wt of each of said teeth (Wt≦Wa+Gp≦2 Ws+Wt), and a further condition that an inner peripheral width Wm of said permanent magnet is greater than 2 slot pitches Wp of said armature core and less than said 2 slot pitches Wp, plus said distal end width Wt of each of said teeth (2 Wp≦Wm≦2 Wp+Wt).

4. A D.C. machine according to claim 3, wherein in case said auxiliary pole and said permanent magnet are juxtaposed to contact with each other so that the circumferential gap Gp is substantially zero, said first mentioned condition is (Wt≦Wa≦2 Ws+Wt).

5. A D.C. machine according to claim 3, wherein the circumferential gap is equal to or less than twice said distal end width Ws of said slot.

6. A D.C. machine according to claim 3, wherein a width of each of said teeth at a position at which a winding coil is wound is equal to or larger than a width said slot at the position at which the winding coil is inserted.

7. A D.C. machine comprising
a cylindrical yoke;
a plurality of field poles each mounted on an inner side of said yoke, and including a permanent magnet and an auxiliary pole juxtaposed on an inner surface of said yoke in a circumferential direction in contact with each other, each auxiliary pole being made of magnetic material exhibiting a reversible permeability higher than that of said permanent magnet and located on a side of each permanent magnet in which magnetic flux is increased by armature reaction;
an armature having an armature coil and armature cores each having a plurality of slots formed therein for said coil and teeth defined thereby, said armature being arranged in said yoke so that distal ends of said teeth face inner sides of said auxiliary poles and said permanent magnets with a predetermined gap; and
brushes provided on one side of said armature and contacting a commutator, characterized in that an inner peripheral width Wm of each of said permanent magnets is equal to or greater than twice a slot pitch Wp of each of said cores and equal to or less than twice a slot pitch Wp plus a distal end width Wt of each of said teeth.

8. A D.C. machine according to claim 7, wherein a width of said each of said teeth at a position at which said armature coil is wound is equal or larger than a width of each of said slots at the position at which said armature coil is inserted.

9. A D.C. machine comprising
a cylindrical yoke;
a plurality of field poles each mounted on an inner side of said yoke, and including permanent magnets and auxiliary poles juxtaposed on an inner surface of said yoke in a circumferential direction with a circumferential gap between each of said permanent magnets and each of said auxiliary poles, each of said auxiliary poles being made of magnetic material exhibiting a reversible permeability higher than that of each of said permanent magnets and located on a side of each of said permanent magnets in which magnetic flux is increased by armature reaction;
an armature having an armature coil and armature cores, each of said armature cores having a plurality of slots formed therein for said coil and teeth defined thereby, said armature being arranged in said yoke so that distal ends of said teeth face inner sides of said plurality poles and said permanent magnets with a predetermined gap; and
brushes provided on one side of said armature and contacting a commutator, characterized in an inner peripheral width Wm of each of said permanent magnets plus the circumferential gap are equal to or larger than twice a slot pitch Wp of each of said armature cores and equal to or less than twice a slot pitch Wp plus a distal end width Wt of each of said teeth.

10. A D.C. machine according to claim 9, wherein a width of said each of said teeth at a position at which said armature coil is wound is equal or larger than a width of each of said slots at the position at which said armature coil is inserted.

* * * * *